United States Patent [19]
Atkins

[11] Patent Number: 5,228,201
[45] Date of Patent: Jul. 20, 1993

[54] COMBINATION KITCHEN UTENSIL

[76] Inventor: Norman J. Atkins, P.O. Box 1207, Blackfoot, Id. 83221

[21] Appl. No.: 846,678

[22] Filed: Mar. 5, 1992

[51] Int. Cl.⁵ ............................................. A47J 43/28
[52] U.S. Cl. ...................................................... 30/322
[58] Field of Search .................. 30/322, 323, 137, 147, 30/148, 150

[56] References Cited

U.S. PATENT DOCUMENTS

| D. 201,291 | 6/1965 | Varkala | 30/332 A X |
| 1,089,118 | 3/1914 | Emory. | |
| 2,524,475 | 10/1950 | Renz | 259/144 |
| 4,132,502 | 1/1979 | Bunke | 416/70 R |

FOREIGN PATENT DOCUMENTS 85199  10/1920  Switzerland ........................ 30/322

Primary Examiner—Douglas D. Watts

[57] ABSTRACT

A combination kitchen utensil is disclosed which incorporates an elongated shank (13), a handle (11) attached to one end of the shank (13) and a tined head (14) which is attached to the other end of the shank (13), depending at an obtuse angle therefrom. The tined head (14) has a "V" shaped slot and at least a pair of fork tines (17) formed therein which point away from the shank (13), again at an obtuse angle with respect to the shank (13). The tined head (14) can include a tapered leading edge (15) to facilitate the sliding of the head between an item of cooking food and the grill. Additionally, the fork tines (17) can be sharpened to facilitate the insertion of the tines (17) into a food product.

2 Claims, 4 Drawing Sheets

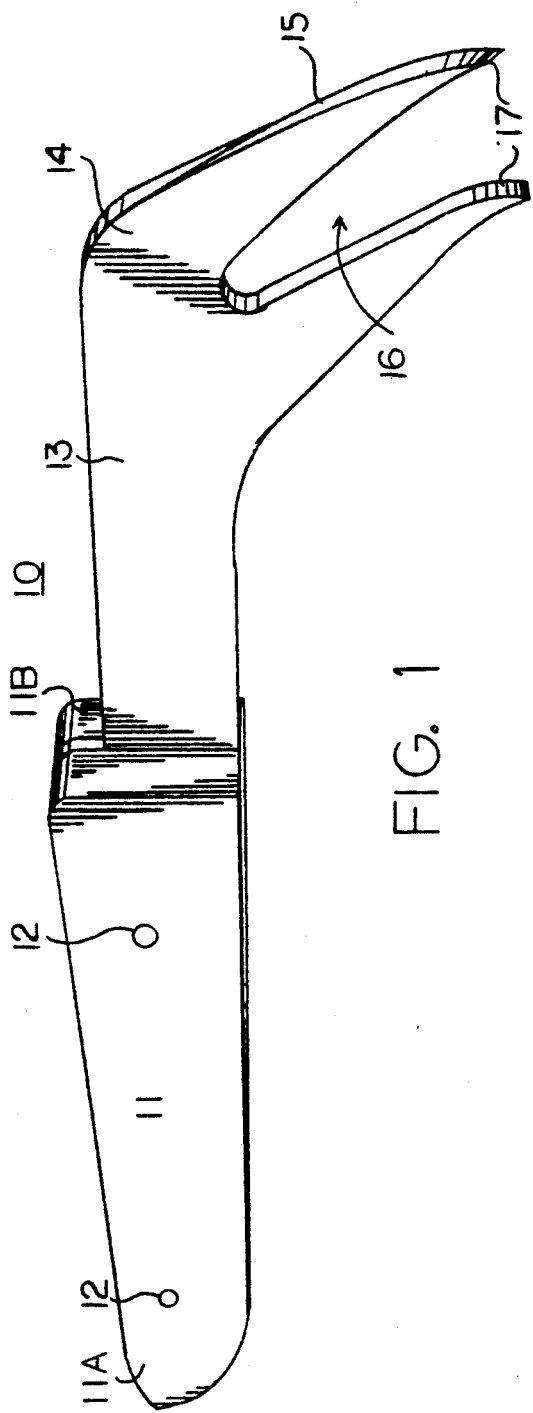
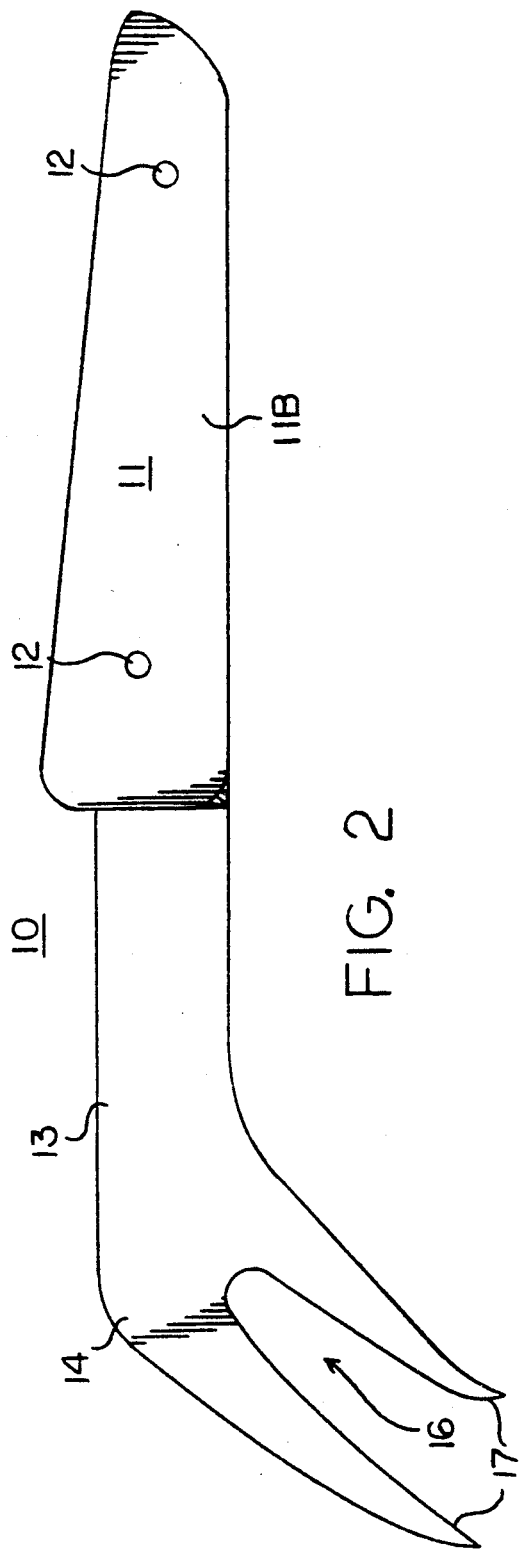
FIG. 1
FIG. 2

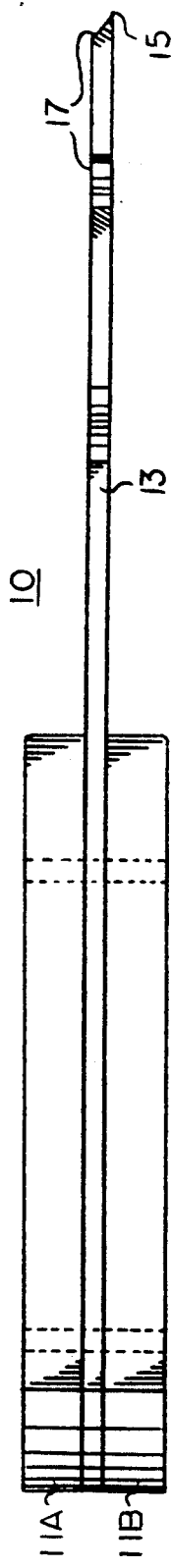
FIG. 3
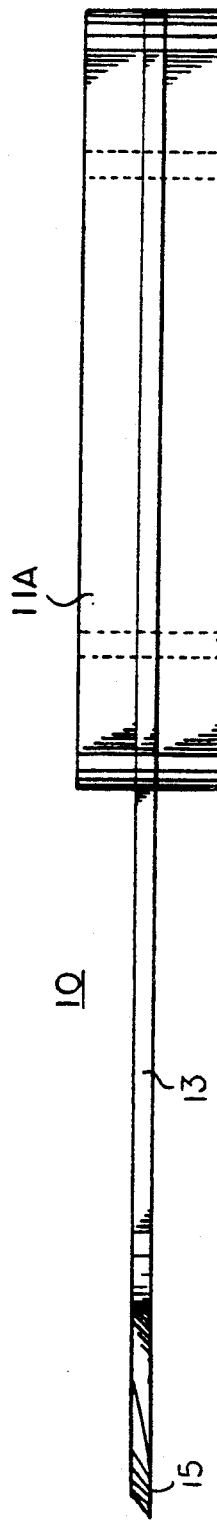
FIG. 4
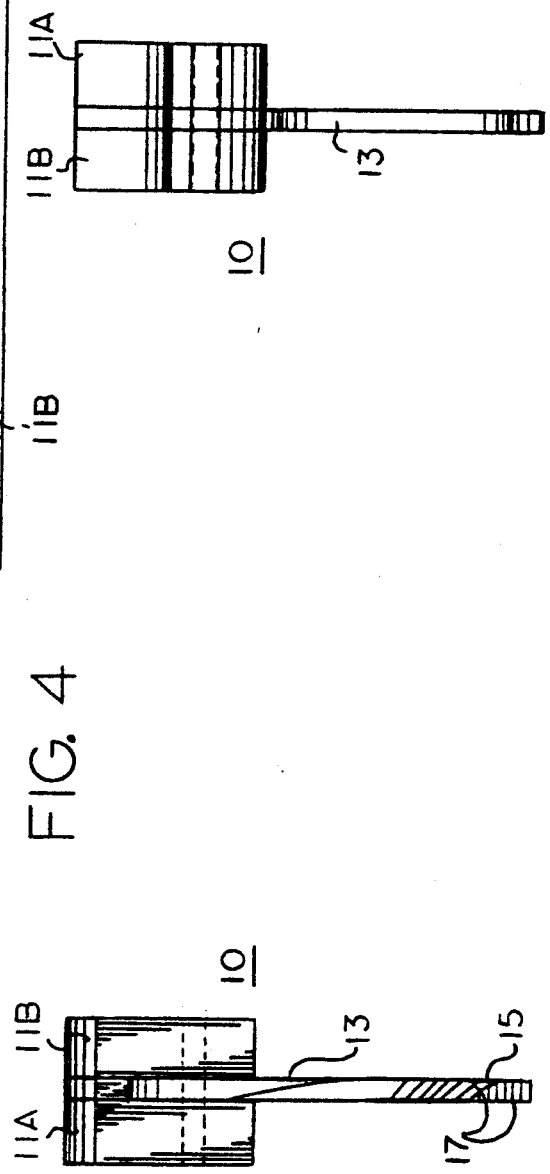
FIG. 6
FIG. 5

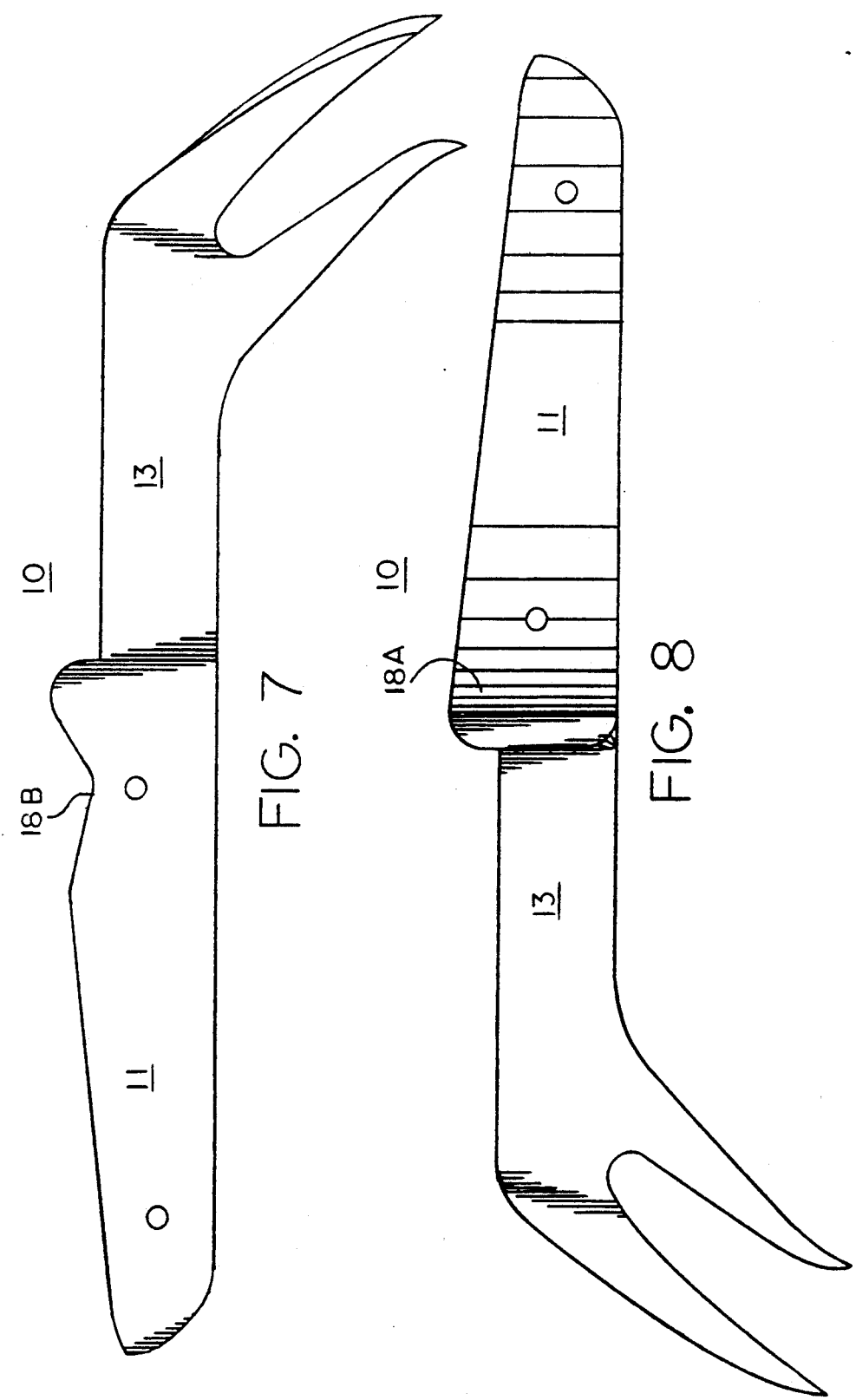

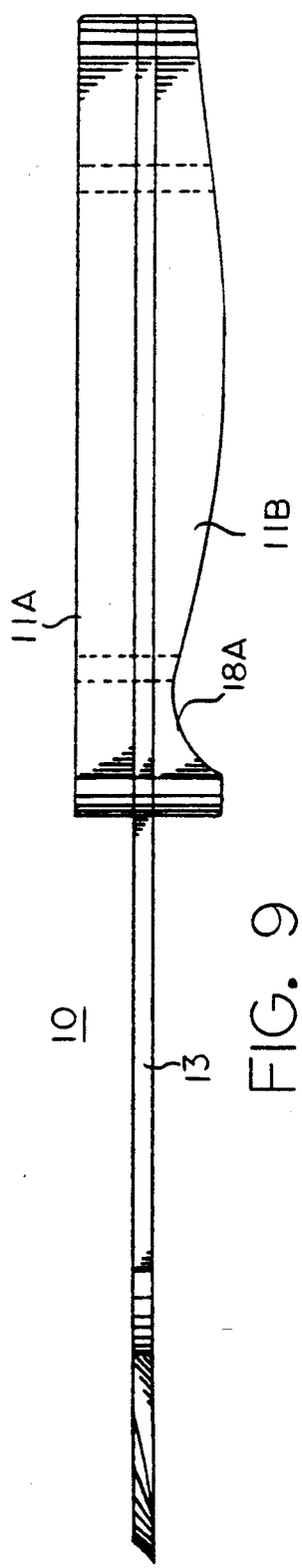

COMBINATION KITCHEN UTENSIL

BACKGROUND OF THE INVENTION

1. Technical Field

This invention generally relates to kitchen utensils, more particularly, this invention relates to a combination utensil for cooking.

2. Background Art

When cooking, it is convenient to have several utensils readily available. A fork is handy for moving cooking meat, for piercing and checking the middle of meat to see how well done it is, as well as for lifting an edge of the meat to gauge how done the underside of the meat is. A spatula is handy for turning or flipping meat and other food items. A spoon is handy for stirring soups and stews, for example. And, a tongs is handy for lifting hot food, and for lifting and moving hot pots and pans. This poses a problem in that there is usually no convenient place to store several utensils at or near the stove, and one must continually switch back and forth among the different utensils. An additional problem is the searing heat one must endure when one has to place their hand directly over the hot stove or on hot pots and pans when lifting or moving them.

EMORY, U.S. Pat. No. 1,089,118, teaches a combined spatula and fork apparatus for turning pancakes and the like. This device is relatively complex in both construction and use when compared to either a spatula or fork and, consequently, is more expensive to manufacture. In use, one must activate a control rod to change the configuration of the device from a spatula to a fork and vice versa.

What is needed is a simple combination kitchen utensil which will perform the functions of a fork, a spatula, a spoon and a tongs. Furthermore, what is needed is a combination cooking utensil for use on a hot stove. Accordingly, some of the objects of this invention are to provide a simple utensil which is a combination fork, spatula, stir-spoon and lifting tongs.

DISCLOSURE OF INVENTION

These and other objects are accomplished by a combination cooking utensil which generally incorporates an elongated shank, a handle attached to one end of the shank and a tined head attached to the other end of the shank, depending at an obtuse angle therefrom. The tined head has at least a pair of fork tines formed therein which point away from the shank, again at an obtuse angle with respect to the shank. The tined head can include a tapered and/or curved leading spatula edge to facilitate the sliding of the head between an item of cooking food and the grill or pan. Additionally, the fork tines can be sharpened to facilitate the insertion of the tines into any food product.

The particular positioning of the tined head and fork tines allow the utensil to be used as a fork, as a spatula, as a stir-spoon and as a lifting tongs.

When used as a fork, the utensil is held with the top of the handle in the palm of the hand, and the angle of the fork tines allow the chef to firmly pierce the cooking food with a downward thrust of the wrist. Also, the angle of the tines allow the chef to turn and lift to flip the food with a twist of the wrist and a pivot of the elbow, either inwardly or outwardly.

When used as a spatula, the handle is generally positioned on a line offset from the center of the food product, as opposed to positioning the handle on a line coincident the center of the food product as would be done with a standard spatula.

When used as a stir-spoon, the utensil is held upside down with the bottom of the handle in the palm of the hand, and the bend at the end of the shank and the tapered front edge of the tined head allow the chef to reach the corners of pots and pans.

When used as a tongs, the "V" shaped slot in the distal end of the tined head allows the chef to grasp with it the edges of hot pots and pans, and their lids, to easily move them about on the stove.

BRIEF DESCRIPTION OF THE DRAWINGS

FIG. 1 is a top-side perspective view of my combination kitchen utensil.

FIG. 2 is a right-side view of my utensil, the left-side view being a mirror image thereof.

FIG. 3 is a bottom view of my utensil.

FIG. 4 is a top view of my utensil.

FIG. 5 is a back end view of my utensil.

FIG. 6 is a front end view of my utensil.

FIG. 7 is a side view of another embodiment of my utensil.

FIG. 8 is a side view of yet another embodiment of my utensil.

FIG. 9 is a top view of the embodiment of my utensil depicted in FIG. 8.

BEST MODE FOR CARRYING OUT INVENTION

Referring now to the figures, my new combination kitchen utensil 10 is shown in detail, with continued reference being made to these figures throughout the following detailed description. Kitchen utensil 10 is familiar in construction in that it has an elongated steel shank 13 to which is secured a handle 11. Here, handle 11 is comprised of a first half 11A and second handle half 11B being attached to opposite sides of shank 13 using handle pins or rivets 12. A generally planar tined head 14 is attached at the forward facing or head end of elongated shank 13. Planar tined head 14 is disposed at an obtuse angle with respect to an imaginary line between the handle end and head end of elongated shank 13. A generally "V" shaped slot is cut or otherwise formed in the distal end of planar tined head 14 such that a pair of fork tines 17 are formed within planar tined head 14. The fork tines 17 can be sharpened to form pointed ends to facilitate the piercing of meat, vegetables or other cooking foodstuffs.

Planar tined head 14 may be provided with an optional slightly curved and tapered front facing edge 15. This feature allows the tined head 14 to be easily inserted between a barbecue grill and a cooking hamburger or the like so that the hamburger may be turned or removed off the barbecue or grill.

Handle halves 11A and 11B may be provided with optional indents 18A and 18B to provide thumb and finger rests in either or all of the front top, front bottom or front sides of the handle halves.

Handle 11 can be constructed from any suitable material such as wood, plastic or the like. Elongated shank 13, tined head 14 and fork tines 17 are generally fashioned out of a single piece of stainless steel, however it is apparent that any durable heat resistant material may be used.

While there is shown and described the present preferred embodiment of the invention, it is to be distinctly understood that this invention is not limited thereto but may be variously embodied to practice within the scope of the following claims.

I claim:

1. A combination kitchen utensil which consists of:

an elongated flat shank having a head end and a handle end;

a flat head extending from the head end of the elongated shank and disposed at an obtuse angle with respect to a central axial line running from the handle end to the head end of the shank; the tined head further having a slot disposed in the distal edge of the tined head, the tined head being configured to form a pair of fork tines within the tined head, each tine depending from the shank at an obtuse angle and each of said tines being sharpened to form a pointed end;

and both of said tines being entirely disposed on one side of said central axial line, and handle means being attached along the handle end of the elongated shank.

2. The utensil of claim 1 wherein the tined head has a tapered forward facing edge.

* * * * *